US012571232B2

(12) United States Patent
Hine

(10) Patent No.: US 12,571,232 B2
(45) Date of Patent: Mar. 10, 2026

(54) DOOR HANDLE WITH REMOVABLE PROTECTIVE INSERT

(71) Applicant: Eric Hine, Cincinnati, OH (US)

(72) Inventor: Eric Hine, Cincinnati, OH (US)

( * ) Notice: Subject to any disclaimer, the term of this patent is extended or adjusted under 35 U.S.C. 154(b) by 64 days.

(21) Appl. No.: 18/439,668

(22) Filed: Feb. 12, 2024

(65) Prior Publication Data

US 2025/0257585 A1 Aug. 14, 2025

(51) Int. Cl.
*E05B 1/00* (2006.01)

(52) U.S. Cl.
CPC ............ *E05B 1/0061* (2013.01); *E05B 1/003* (2013.01)

(58) Field of Classification Search
CPC ......... E05B 1/0061; E05B 1/0084; E05B 1/04
See application file for complete search history.

(56) References Cited

U.S. PATENT DOCUMENTS

| | | | | |
|---|---|---|---|---|
| 2,125,783 | A * | 8/1938 | Heeman | E05B 1/0061 16/86 A |
| 8,307,581 | B2 | 11/2012 | Badgley et al. | |
| 10,273,714 | B2 | 4/2019 | Kim | |
| 2003/0033690 | A1 | 2/2003 | Lin | |
| 2004/0040120 | A1* | 3/2004 | Zaidman | A47B 95/02 16/436 |
| 2007/0094905 | A1 | 5/2007 | Thompson | |

FOREIGN PATENT DOCUMENTS

| | | | | |
|---|---|---|---|---|
| CN | 105332552 | A * | 2/2016 | E05B 1/0061 |
| DE | 29622002 | U1 * | 4/1998 | E05B 1/04 |
| KR | 200165513 | | 2/2000 | |
| KR | 200165514 | | 2/2000 | |
| KR | 20010000784 | U * | 1/2001 | |
| KR | 200306987 | Y1 * | 3/2003 | |
| KR | 200319130 | Y1 * | 7/2003 | |
| KR | 100836579 | | 6/2008 | |
| KR | 100836579 | B1 * | 6/2008 | |
| KR | 101732962 | | 5/2017 | |

OTHER PUBLICATIONS

Machine Translation of KR 100836579 B1 (Year: 2008).*
Machine Translation of KR 20010000784 U (Year: 2001).*
Machine Translation of KR 200306987 Y1 (Year: 2003).*
Machine Translation of KR 200319130 Y1 (Year: 2003).*
Machine Translation of DE 29622002 U1 (Year: 1998).*

* cited by examiner

*Primary Examiner* — Christine M Mills

(57) ABSTRACT

Embodiments of the present invention comprise a door handle with a handle body connected to a door via a door connector. A slot may be configured in the handle body. The slot may have an open end and an open front that expose an inside of the slot to an exterior of the handle body. One or more slot bars may be configured within the slot. An insert may have one or more slot bar receivers that are each configured to receive one of the one or more slot bars. The insert may be removably configured within the slot. A protruding insert portion may protrude from the slot open end and/or the slot open front. The protruding insert portion may act as a barrier between the handle body and an object to prevent damage to the door handle and/or object.

7 Claims, 6 Drawing Sheets

DOOR HANDLE WITH REMOVABLE PROTECTIVE INSERT

BACKGROUND OF THE INVENTION

The present invention relates to door handles. In many buildings, internal doors are configured near corners of walls, wherein when the door is opened, the handle of the door contacts the wall. This may cause damage to the wall and/or door handle. Devices such as door stops exist that act as barriers between doors and walls or between door handles and walls. Such devices are generally configured on a door, on a wall, or over the door handle.

SUMMARY OF THE INVENTION

Embodiments of the present invention comprise a door handle. A door connector of the door handle may be connected to a door. A handle body may be connected to the door connector, whereby the handle body is connected to the door via the door connector. The handle body may be rotatable about the door connector. Rotating the handle body about the door connector may activate a latch which may aid in opening or closing the door. The door handle may be implemented on any door. The door connector, as well as the other components of the door handle, may be sized and shaped to fit standard door prep holes in doors. Standard door prep holes in doors are generally 2⅛" in diameter. This is not to say that the door connector or any other component of the door handle is exactly 2⅛" in diameter, but that the door connector is sized appropriately to be implemented on a door with a 2⅛" diameter door prep hole.

A slot may be configured in the handle body. The slot may have a slot closed end. The slot may have a slot open end configured opposite the slot closed end. The slot may have a slot top. The slot may have a slot bottom configured opposite the slot top. The slot may have a slot back. The slot may have a slot open front configured opposite the slot back. The slot closed end, slot top, slot bottom, and slot back may be faces that are formed by the material of the handle body. The slot open end and slot open front may be open faces that expose the slot to an exterior.

A slot centerline may extend from the slot closed end to the slot open end. The slot centerline may further extend past the slot open end and the slot closed end, and may thereby existing as an endless line in space. The slot centerline may be configured within a slot plane. The slot plane may be parallel to the slot back and the slot open face. The slot plane may extend past the boundaries of the slot and thereby may exist as an endless plane in space.

One or more slot bars may be configured within the slot. The one or more slot bars may be connected to the slot closed end, slot back, slot top, and/or slot bottom. In some embodiments, the one or more slot bars may be only connected to one slot face, such as the slot closed end, slot back, slot top, or slot bottom. In other embodiments, the one or more slot bars may be connected to multiple slot faces. For example, one of the one or more slot bars may be connected to both the slot top and the slot closed end. Another one of the one or more slot bars may be connected to both the slot bottom and the slot closed end.

An insert may have one or more slot bar receivers, which may be configured to receive the one or more slot bars. Each of the one or more slot bar receivers may be configured over one of the one or more slot bars. When each of the one or more slot bar receivers is configured over one of the one or more slot bars, the insert may be configured at least partially inside of the slot. When the insert is configured partially inside the slot, a protruding insert portion may protrude from the slot, and therefore protrude from the handle body. The protruding insert portion may protrude from the slot open end and/or the slot open front. The protruding insert portion may contact an object to prevent the object from contacting the handle body.

For example, the door to which the door handle is connected may be opened towards a wall. If the insert were not configured within the slot, the handle body may contact the wall and thereby damage the wall (or vice versa, the wall may damage the door handle). When the insert is configured within the slot whereby the protruding insert portion protrudes from the handle body, the protruding insert portion may contact the wall instead of the handle body, thereby preventing damage to the wall or door handle. In this regard, the insert may serve as a barrier between the door handle and an object, wherein said barrier is integral to the door handle itself rather than being configured over the door handle.

The insert may be made of a material with a Young's Modulus in the range of 1 MPa-50 MPa, inclusive of said values. This is to say that the insert may be substantially elastic, whereby it may absorb the force of the door handle moving towards an object (such as a wall). This allows the insert to prevent damage to the object, handle body, or other components of the door handle without the insert itself being damaged. In such embodiments, the insert may be made of silicone, natural rubber, or the like.

The insert may be removably configured within the slot. This may allow for the door handle to be easily implemented on the door. The insert may be held within the slot by friction between the one or more slot bars and the one or more slot bar receivers. The insert may be permanently configured within the slot by applying adhesive to a portion of the slot or slot bar that contacts the insert. Alternatively, the adhesive may be applied to just the insert, or to both the insert and the slot/slot bar.

In some embodiments, the one or more slot bars may be one slot bar. In such embodiments, the one or more slot bar receivers of the insert may be one slot bar receiver. The one slot bar may be configured parallel to the slot centerline. The one slot bar may be connected to the rest of the door handle at least at the slot closed end, slot top, slot bottom, or slot back. Alternatively, the one slot bar may be connected to the rest of the door handle only at the slot closed end, slot top, slot bottom, or slot back. The one slot bar may be configured parallel to the slot centerline. Furthermore, the one slot bar may be configured along the slot centerline.

In other embodiments, the one or more slot bars may be two slot bars wherein the two slot bars are a first slot bar and a second slot bar. In such embodiments, the one or more slot bar receivers of the insert may be two slot bar receivers wherein the two slot bar receivers are a first slot bar receiver and a second slot bar receiver. The first slot bar receiver may be configured over the first slot bar, and the second slot bar receiver may be configured over the second slot bar. The first slot bar and the second slot bar may be configured parallel to each other. The first slot bar and the second slot bar may be configured parallel to the slot centerline. Alternatively, the first slot bar and the second slot bar may be configured perpendicular to the slot centerline. The first slot bar may be connected to the rest of the door handle at least at the slot top. The second slot bar may be connected to the rest of the door handle at least at the slot bottom.

In some embodiments, the slot centerline may be linear (i.e. a straight line). In other embodiments, the slot centerline may follow a curved path along the centerline plane.

The curved path of the slot centerline may be defined by a quadratic function, a cubic function, or any other function defining a non-linear path. The curved path may be configured along the slot centerline plane. The handle body may be shaped wherein the shape of the handle body follows the same curved path as the slot centerline. The slot may also be shaped wherein the shape of the slot follows the same curved path as the slot centerline. The one or more slot bars may also be shaped wherein the shapes of the one or more slot bars follow the same curved path as the slot centerline.

Figure 3:
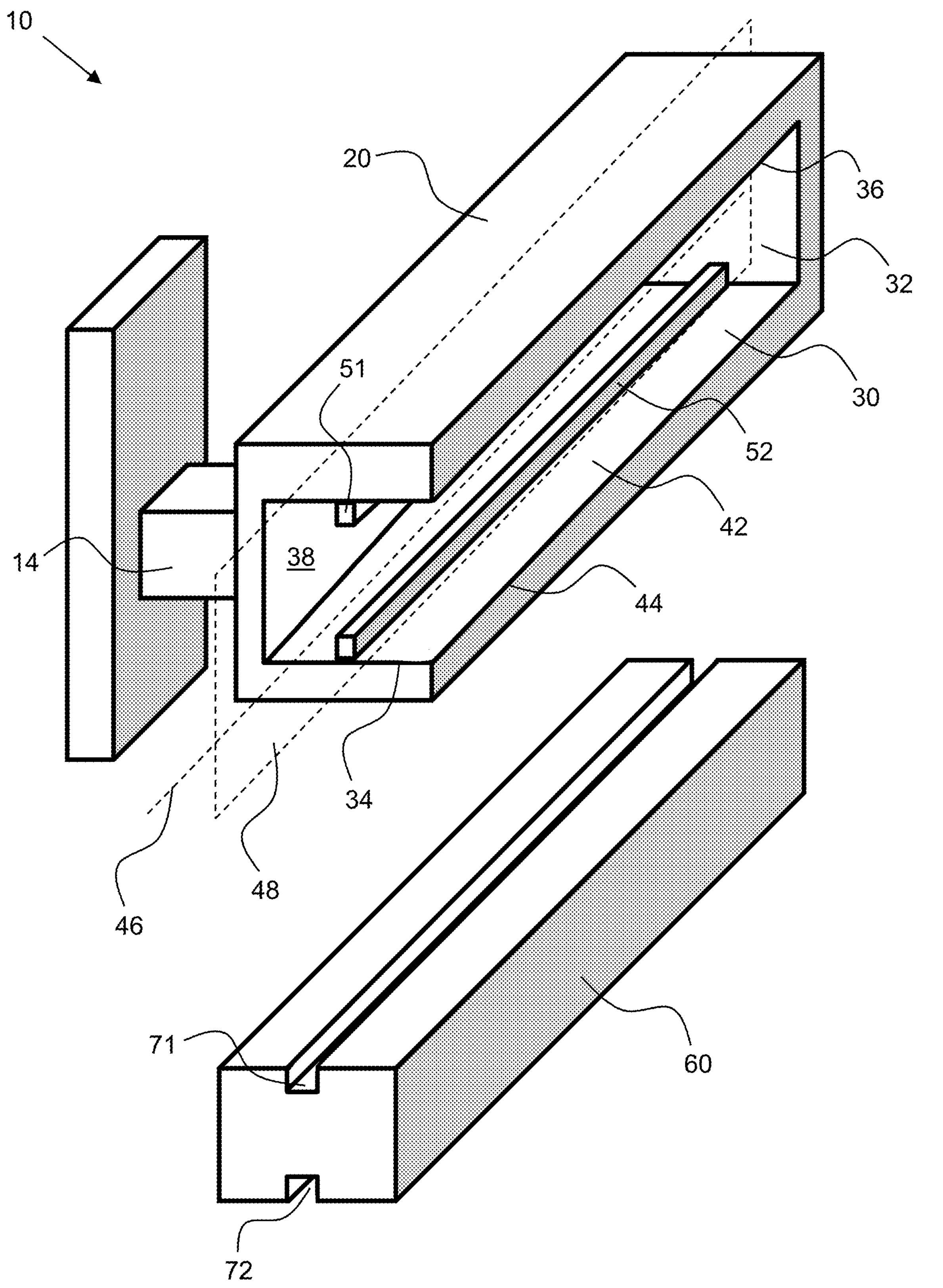
FIG. 3 shows a door handle with a linear slot centerline and two slot bars according to some embodiments of the present invention.
Figure 4:
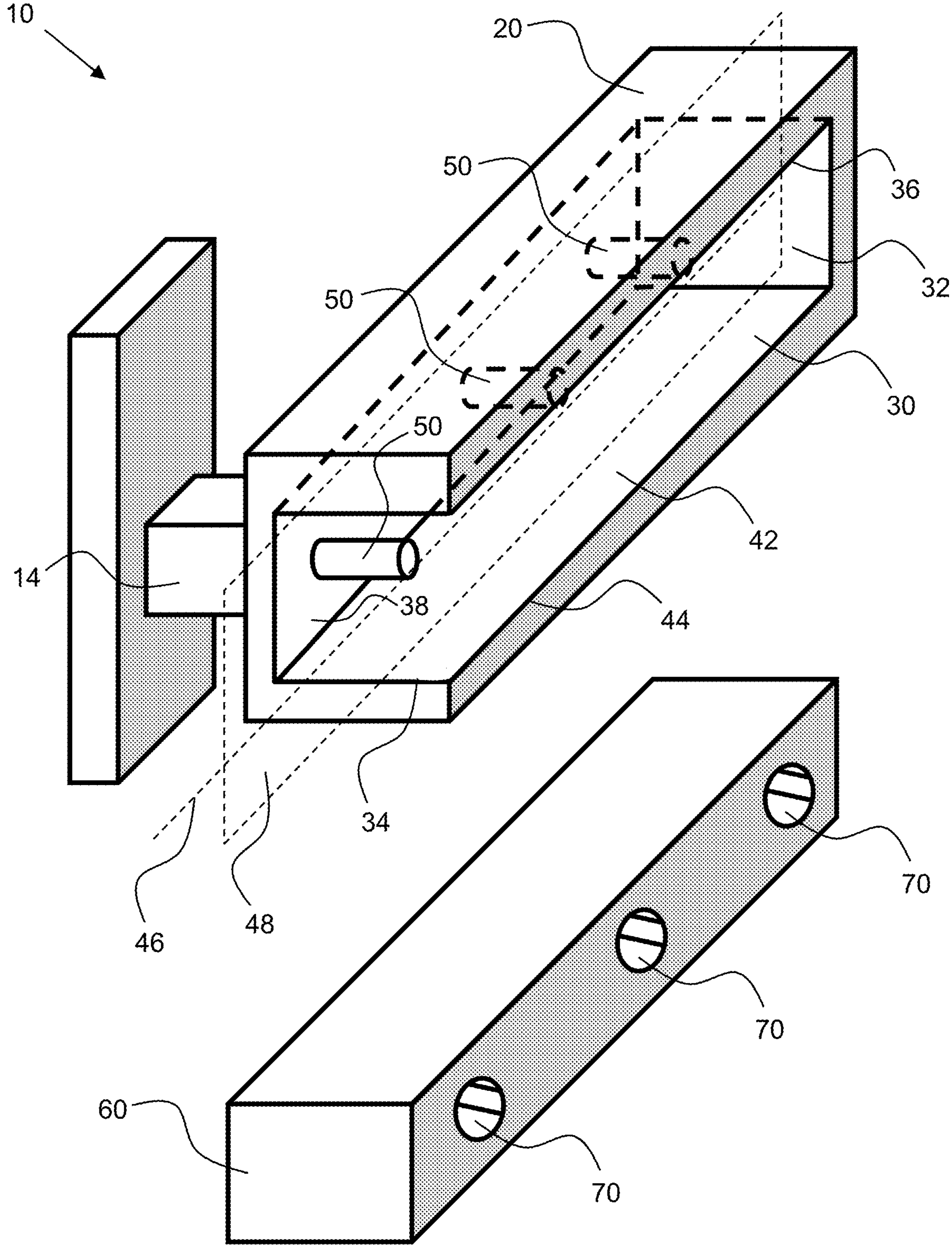
FIG. 4 shows a door handle with a linear slot centerline and three slot bars according to some embodiments of the present invention.

The thinner broken lines in FIGS. 1 and FIGS. 3-6 show the slot centerline and slot centerline plane of the respective embodiments of the door handle. The thicker broken lines in FIG. 4 show parts of the door handle that would otherwise not be visible in FIG. 4.

DETAILED DESCRIPTION OF THE INVENTION

The description provided herein describes example embodiments of the present invention and is not intended to limit the invention to any particular embodiment, feature, component, material, design, shape, size, or any other property. The drawings provided herein show example embodiments of the present invention and are not intended to limit the invention to any particular embodiment, feature, component, material, design, shape, size, or any other property. The present invention may comprise any combination of the various embodiments described herein. Other embodiments may be created by combining features, components, and designs described in different embodiments herein.

Figure 1:
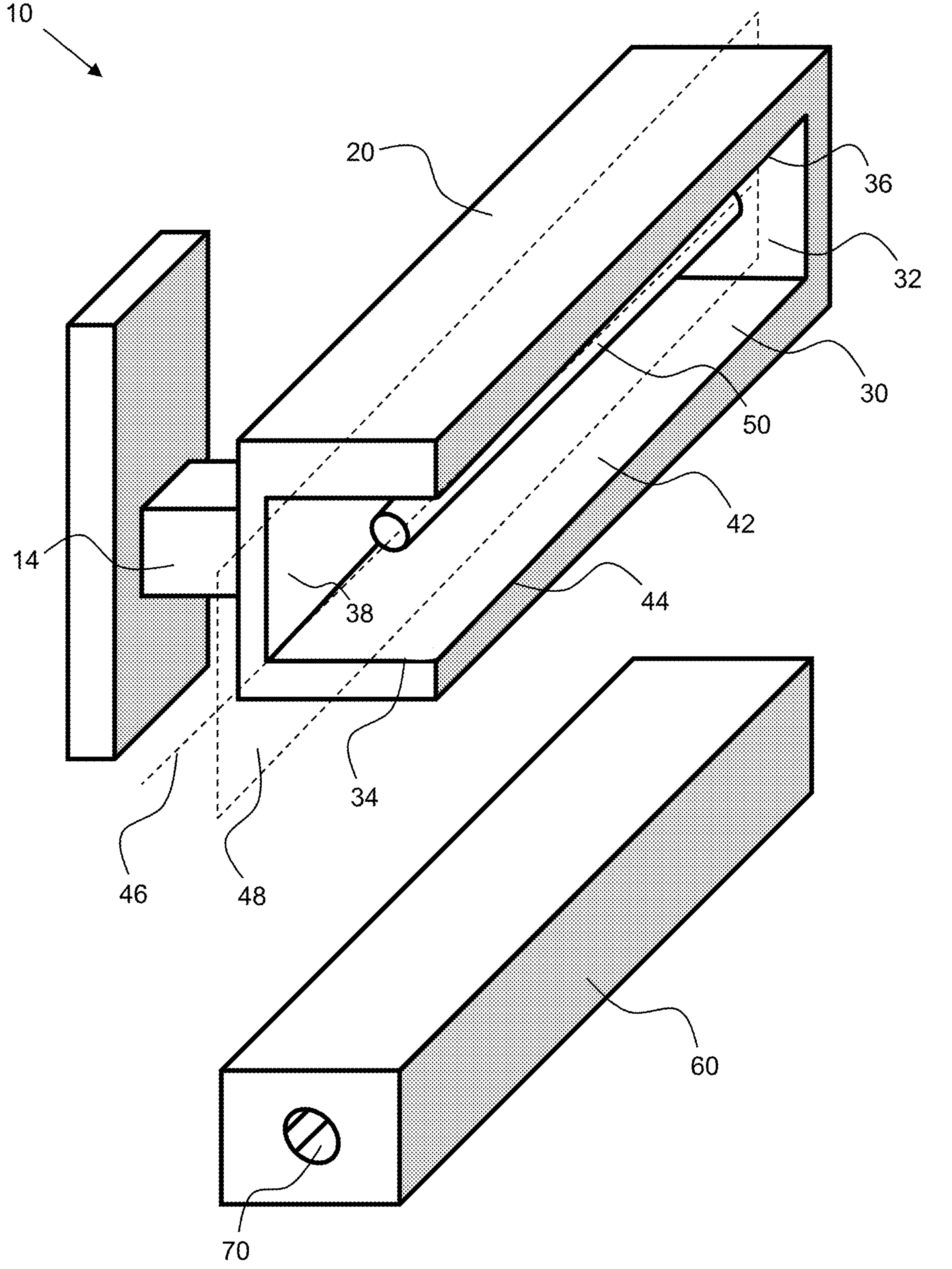
FIG. 1 shows a door handle with a linear slot centerline and one slot bar according to some embodiments of the present invention.

As shown in FIG. 1, a handle body 20 of a door handle 10 is connected to a door connector 14. The door connector 14 may be connected to a door (not shown in FIG. 1). A slot 30 is configured within the handle body 20. The slot 30 has a slot closed end 32, a slot open end 34 opposite the slot closed end 32, a slot back 38, a slot open front 44 opposite the slot back 38, a slot top 36, and a slot bottom 42 opposite the slot top 36. The slot closed end 32, slot back 38, slot top 36, and slot bottom 42 are formed by the material of the handle body 20. The slot open end 34 and slot open front 44 are open faces that expose the slot 30 to an exterior.

A slot bar 50 is configured in the slot 30. As shown in FIG. 1, the slot bar 50 is connected only to the slot closed end 32. A slot centerline 46 extends along the handle body 20 from the slot closed end 32 through the slot open end 34. The slot centerline 46 extends along a slot centerline plane 48. The slot bar 50 is linear and extends parallel to the slot centerline 46. In some embodiments, the slot bar 50 may extend along the slot centerline 46.

An insert 60 is shown outside of the slot 30 in FIG. 1. The insert 60 has a slot bar receiver 70 that may be configured over the slot bar 50 when the insert 60 is configured in the slot 30. The slot bar receiver 70 may extend all the way through the insert 60. Alternatively, the slot bar receiver 70 may only extend partway through the insert 60.

Figure 2:
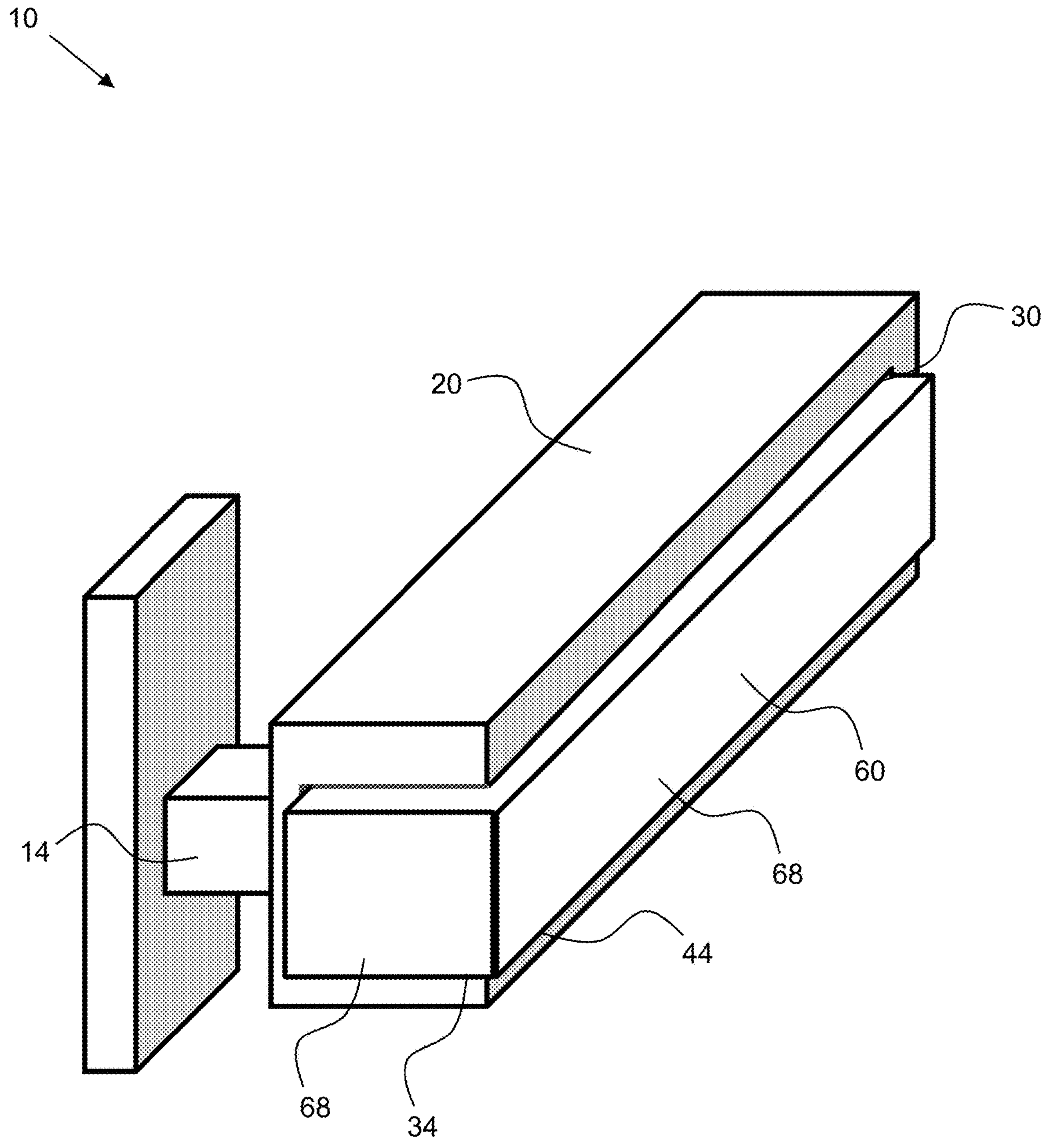
FIG. 2 shows the door handle of FIG. 1 with an insert configured within a slot of the door handle.

As shown in FIG. 2, the insert 60 is configured in the slot 30. The slot bar receiver is not visible in FIG. 2 since it does not extend all the way through the insert 60. A protruding insert portion 68 extends outside of the slot 30 via the slot open end 34 and the slot open front 44. The protruding insert portion 68 may extend past the handle body 20 whereby the protruding insert portion 68 prevents an object from contacting the handle body 20, thereby preventing the object or door handle 10 from being damaged.

As shown in FIG. 3, a door handle 10 has two slot bars: a first slot bar 51 and a second slot bar 52. The first slot bar 51 is connected to the handle body 20 at the slot top 36. The first slot bar 51 may also be connected to the handle body 20 at the slot closed end 32. The second slot bar 52 is connected to the handle body 20 at the slot bottom 42. The second slot bar 52 may also be connected to the handle body 20 at the slot closed end 32. The first slot bar 51 and second slot bar 52 are configured parallel to one another. The first slot bar 51 and second slot bar 52 are also configured parallel to the slot centerline 46, which extends linearly along the slot centerline plane 48.

The insert 60 shown in FIG. 3 has two slot bar receivers: a first slot bar receiver 71 and a second slot bar receiver 72. The first slot bar receiver 71 and second slot bar receiver 72 are configured parallel to each other. The first slot bar receiver 71 may be configured over the first slot bar 51, and the second slot bar receiver 72 may be configured over the second slot bar 52, when the insert 60 is configured within the slot 30.

As shown in FIG. 4, three slot bars 50 are configured within the slot 30 of a door handle 10. The three slot bars 50 are configured parallel to each other. Each of the three slot bars 50 are configured perpendicular to the slot centerline 46. Each of the three slot bars 50 are connected to the handle body 20 only at the slot back 38. The three slot bars 50 are configured perpendicular to the slot centerline 46.

The insert 60 shown in FIG. 4 has three slot bar receivers 70, each of which corresponds to one of the three slot bars 50. Each of the three slot bar receivers 70 is configured over a corresponding slot bar 50 when the insert 60 is configured within the slot 30. The slot bar receivers 70 are configured parallel to each other. The slot bar receivers may extend all the way through the insert 60. Alternatively, the slot bar receivers 70 may extend only partway through the insert 60.

In the embodiments shown and described in FIGS. 1-4, the slot bottom 42 may be parallel to the slot top 36. The slot closed end 32 may be parallel to the slot open end 34. The slot back 38 may be parallel to the slot open front 44. The three pairs of parallel faces described in this paragraph may all be perpendicular to each other, whereby the slot 30 is a rectangular prism. Furthermore, the handle body 20 may also be a rectangular prism as shown in FIGS. 1-4. This is not to limit the slot 30 or handle body 20 in other embodiments to being rectangular prisms. In some embodiments, corners and edges of the handle body 20 and/or slot 30 may be rounded. In some embodiments, the handle body 20 and slot 30 may cylinders rather than rectangular prisms. In some embodiments, the insert 60 may be the same shape as the slot 30 (i.e. the insert 60 may be a rectangular prism with the slot 30 is a rectangular prism). In other embodiments, the insert 60 may be made of a substantially flexible material as described further herein whereby the insert 60 may at least partially conform to the shape of the slot 30. In embodiments wherein the handle body 20 and slot 30 are cylinders, the slot top, slot bottom, and slot back form one continuous surface.

Figure 5:
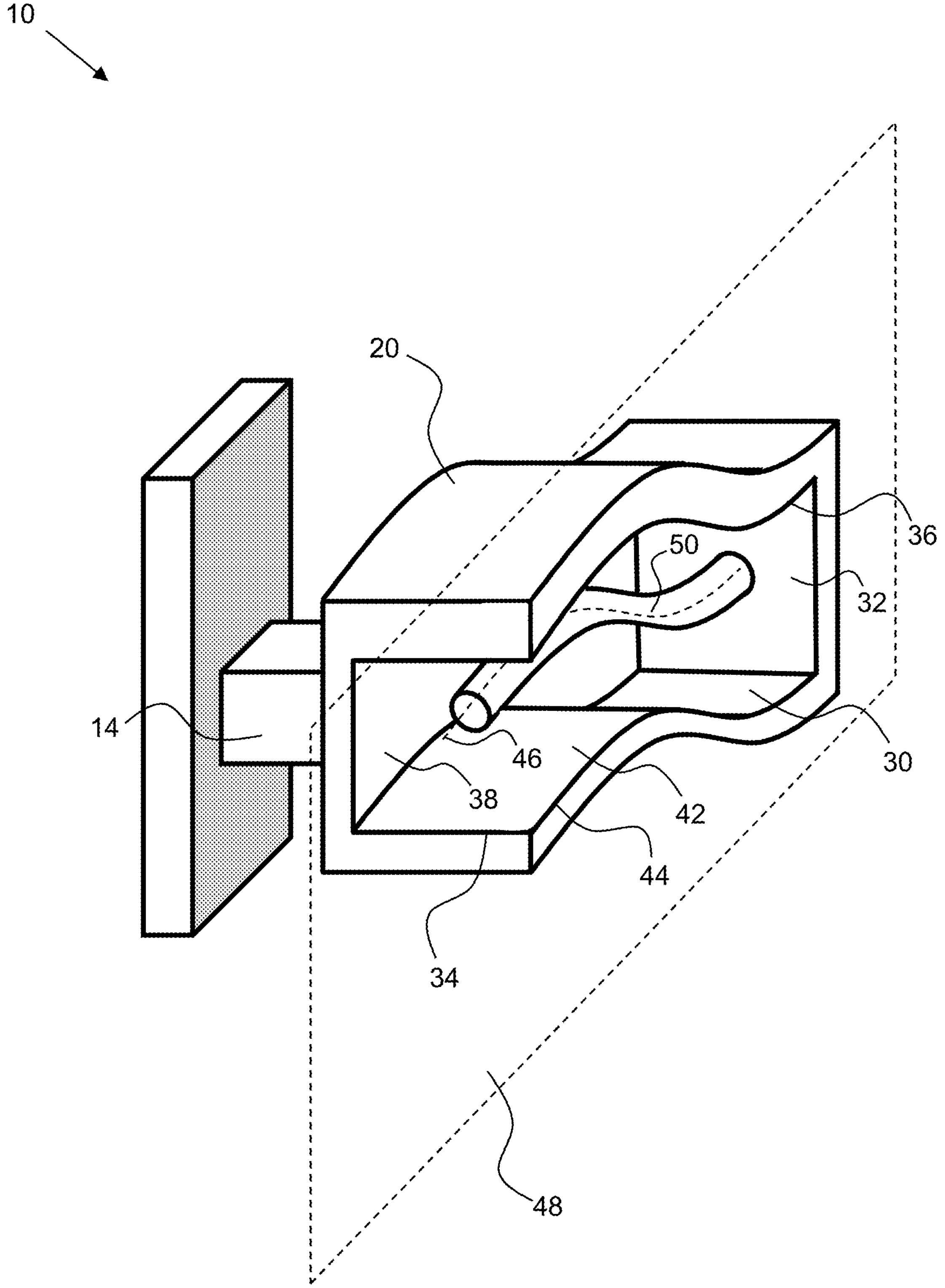
FIG. 5 shows a door handle with a curved slot centerline and one slot bar according to some embodiments of the present invention.

As shown in FIG. 5, the slot centerline 46 follows a curved path along the slot centerline plane 48. The curved path may be defined by a cubic function plotted along the slot centerline plane 48. The handle body 20 and slot 30 are shaped in a manner that follows the curved path of the slot centerline 46. The slot bar 50 is also shaped in a manner that follows the curved path of the slot centerline 46. The slot bar 50 is configured parallel to the slot centerline 46. In some embodiments, the slot bar 50 may be configured along the slot centerline 46.

Figure 6:
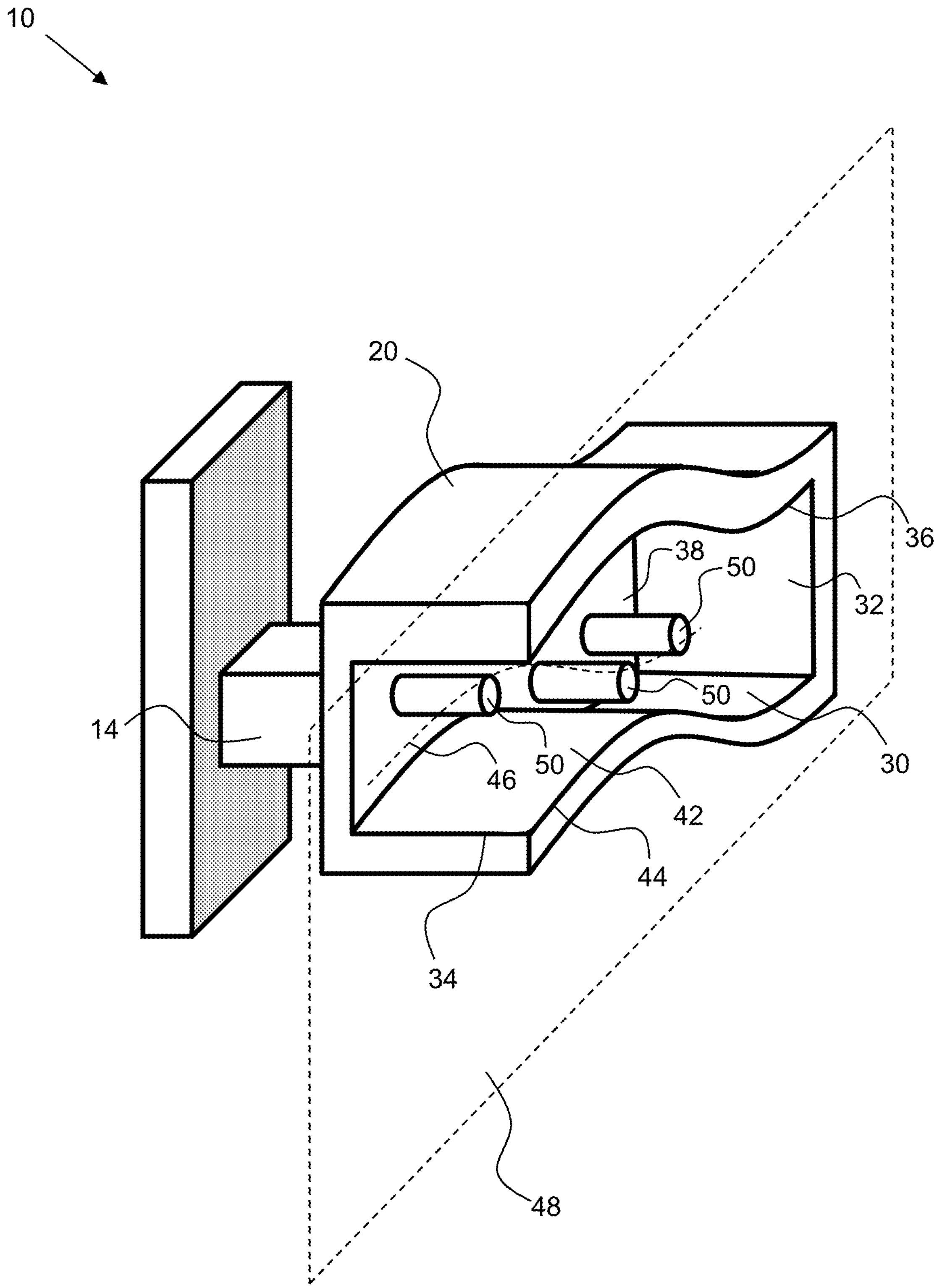
FIG. 6 shows a door handle with a curved slot centerline and three slot bars according to some embodiments of the present invention.

As shown in FIG. 6, the slot centerline 46, handle body 20, and slot 30 follow the same curved path as in FIG. 5. As shown in FIG. 6, there are three slot bars 50 that extend linearly from the slot back 38. The three slot bars 50 are connected to the handle body 20 only at the slot back 38. The three slot bars 50 are configured perpendicular to the slot centerline 46.

In embodiments such as those shown and described in FIGS. 5 and 6, the insert (not shown in FIGS. 5 and 6) may be made of a material with a Young's Modulus in the range of 1 MPa-50 MPa, inclusive of said values. This is to say that the insert may be substantially flexible whereby it can be temporarily deformed to fit the shape of the handle body 20 and slot 30 when the handle body 20 and slot 30 follow a curved path along the slot centerline plane 48. In such embodiments, the insert may be made out of silicone, natural rubber, or the like.

As shown in FIGS. 1-6, the slot centerline plane 48 is configured parallel to the slot back 38 and the slot open front 44. The slot centerline plane 48 is configured between the slot back 38 and the slot open front 44.

The invention claimed is:

1. A door handle comprising:

a door connector connected to a door;

a handle body connected to the door connector;

a slot configured in the handle body, the slot comprising:

a slot closed end;

a slot open end configured opposite the slot closed end;

a slot top;

a slot bottom configured opposite the slot top;

a slot back;

a slot open front configured opposite the slot back;

a slot centerline extending from the slot closed end to the slot open end;

one or more slot bars configured within the slot perpendicular to the slot centerline and connected to the rest of the door handle only at the slot back, the one or more slot bars each comprising a slot bar mating surface that is uniform without protrusions or indentations;

an insert comprising:

an insert thickness extending parallel to the one or more slot bars;

one or more slot bar receivers, each of the one or more slot bar receivers comprising a slot bar receiver mating surface that is uniform without protrusions or indentations, wherein each of the one or more slot bar receivers is removably configured over one of the one or more slot bars without deforming or damaging the insert, wherein the corresponding slot bar mating surfaces are configured concentrically to the corresponding slot bar receiver mating surfaces, whereby the insert is configured partially inside the slot, whereby a protruding insert portion protrudes from the handle body, wherein the protruding insert portion contacts an object to prevent the object from contacting the handle body.

2. The door handle of claim 1, wherein the slot back comprises a slot back thickness extending in a direction parallel to the one or more slot bars, wherein the insert thickness is at least four times greater than the slot back.

3. The door handle of claim 1, wherein the slot bar receivers extend through the entire insert thickness.

4. The door handle of claim 1, wherein the slot centerline is linear.

5. The door handle of claim 1, wherein the slot centerline follows a curved path along a slot centerline plane, wherein the handle body is shaped whereby the shape of the handle body follows the curved path, wherein the curved path progresses along the slot centerline plane in only two coordinate directions out of a possible four coordinate directions of the slot centerline plane.

6. The door handle of claim 1, wherein the protruding insert portion protrudes from the slot open end and the slot open front.

7. The door handle of claim 1, wherein the slot top, slot bottom, and slot back form one continuous surface.

* * * * *